United States Patent [19]

Baba

[11] 4,160,499

[45] Jul. 10, 1979

[54] TWO-LEVER CONTROL UNIT

[75] Inventor: Masanao Baba, Takarazuka, Japan

[73] Assignee: Nippon Cable System Inc., Hyogo, Japan

[21] Appl. No.: 832,641

[22] Filed: Sep. 12, 1977

[30] Foreign Application Priority Data

Aug. 9, 1977 [JP] Japan ................................ 52-107080

[51] Int. Cl.$^2$ ........................ G05G 5/08; F16H 57/06;

[52] U.S. Cl. .................................... 192/0.098; 74/878

[58] Field of Search ........................... 192/0.096, 0.098 74/477, 878

[56] References Cited

U.S. PATENT DOCUMENTS

| | | | |
|---|---|---|---|
| 2,716,474 | 8/1955 | Panish | 192/0.096 |
| 2,771,168 | 11/1956 | Panish | 192/0.096 |
| 3,204,732 | 9/1965 | Morse | 192/0.096 |
| 3,382,737 | 5/1968 | Manzolillo | 74/878 |

FOREIGN PATENT DOCUMENTS

| | | | |
|---|---|---|---|
| 936608 | 9/1963 | United Kingdom | 74/878 |

*Primary Examiner*—Allan D. Herrmann
*Attorney, Agent, or Firm*—Armstrong, Nikaido, Marmelstein & Kubovcik

[57] ABSTRACT

In a two-lever control unit including a shaft mounted on the main body of the unit, a clutch operating plate and a throttle operating plate both rotatably supported by the shaft, a clutch lever for moving the clutch operating plate and a throttle lever for moving the throttle operating plate, a locking pin extends through a bore in the main body and has one end engageable in three locking cavities formed in the clutch operating plate and the other end engageable in a locking cavity formed in the throttle operating plate. One of the operating plates, when turned, causes the locking pin to lock the other operating plate. Thus, the clutch lever, when operated, locks the throttle lever, whereas when the throttle lever is operated, the clutch lever is locked. This simple structure gives the control unit greatly improved safety.

5 Claims, 3 Drawing Figures

TWO-LEVER CONTROL UNIT

BACKGROUND OF THE INVENTION

This invention relates to a novel two-lever control unit, and more particularly to a control unit having a throttle lever and a clutch lever one of which can be locked reliably when the other lever is operated, the control unit therefore being operable with improved safety.

Single lever control units and two-lever control units have heretofore been used as so-called dual control units for controlling the marine engine either in the cabin or on the bridge as desired. Two-lever control units comprise a shaft mounted on the main body of the unit, a clutch operating plate and a throttle operating plate both rotatably supported by the shaft, and a clutch lever and a throttle lever for driving the operating plates respectively, the levers being freely movable independently of each other. Such control units involve the risk of reckless driving that while the boat is driven at a high speed with the clutch lever in its forward position, the clutch lever is shifted to the reverse position to brake the boat. The control units are further subject to a similar risk when an external force acts on the clutch lever for one cause or another.

With control units of the type described, the end of the clutch cable or throttle cable pivoted to the clutch operating plate or to the throttle operating plate is swung by the turn of the operating plate about a point where the cable is supported. Accordingly the units have the problem that frequent use of the lever reduces the life of the cable because the stroke of the swing is great.

OBJECTS OF THE INVENTION

An object of this invention is to provide an improved two-lever engine control unit.

Another object of this invention is to provide an engine control unit having a clutch lever and a throttle lever either one of which is lockable while the other lever is in operation so that the unit can be operated with enhanced safety.

Another object of this invention is to provide a two-lever engine control unit in which the stroke of the swing of the clutch cable or throttle cable due to the turn of the corresponding lever has been minimized so as to lengthen the life of the cable, each lever further being rendered smoothly movable.

Still another object of this invention is to provide a two-lever engine control unit by which the engine can be initiated into warm-up operation by a simple procedure with safety and subsequently changed over for the usual operation with ease.

Other objects of this invention will become apparent from the following description with reference to the accompanying drawings.

DETAILED DESCRIPTION OF THE INVENTION

Figure 1:
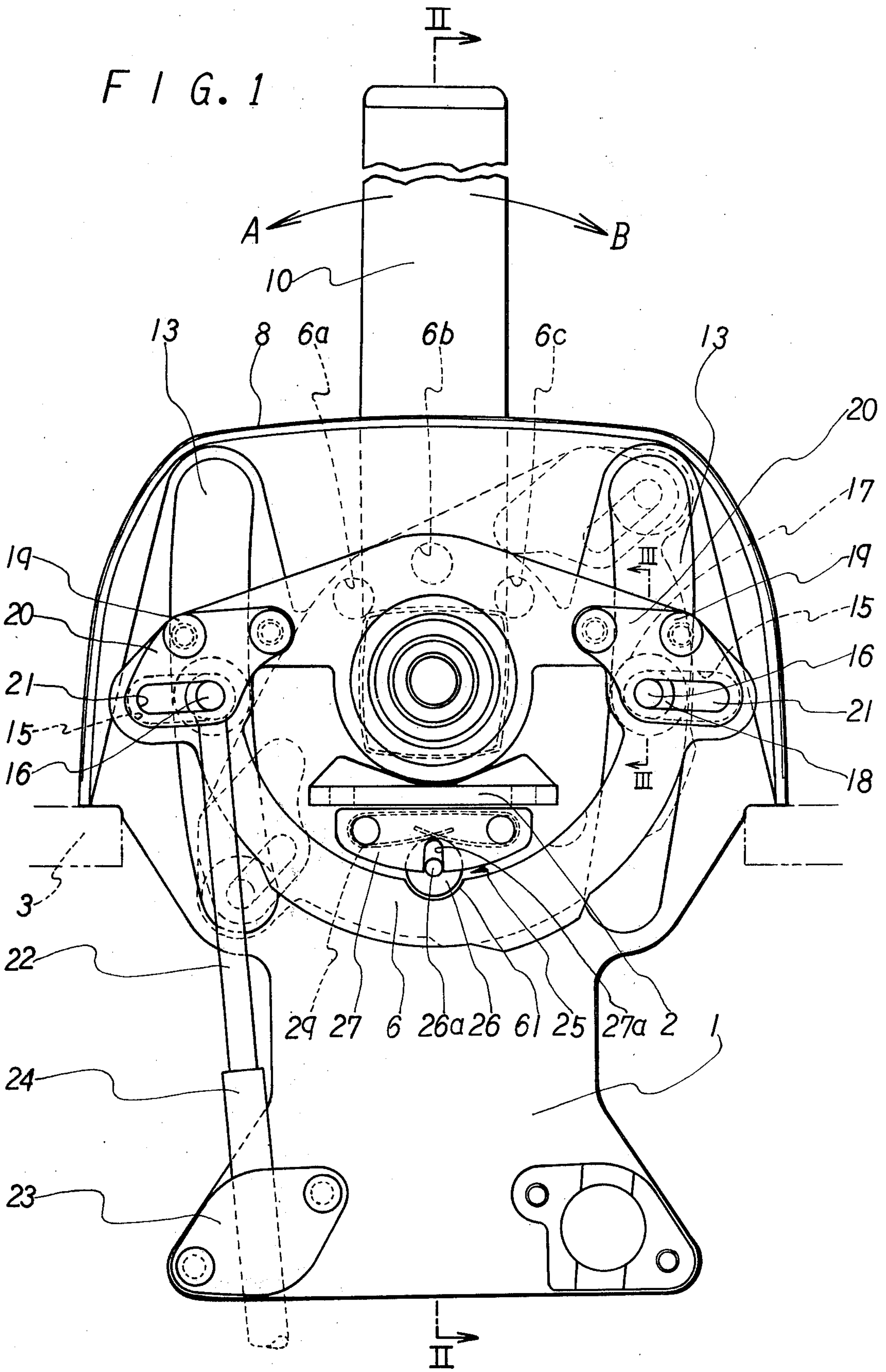
FIG. 1 is a front view showing an embodiment of the control lever unit of this invention with part of its casing removed.
Figure 2:
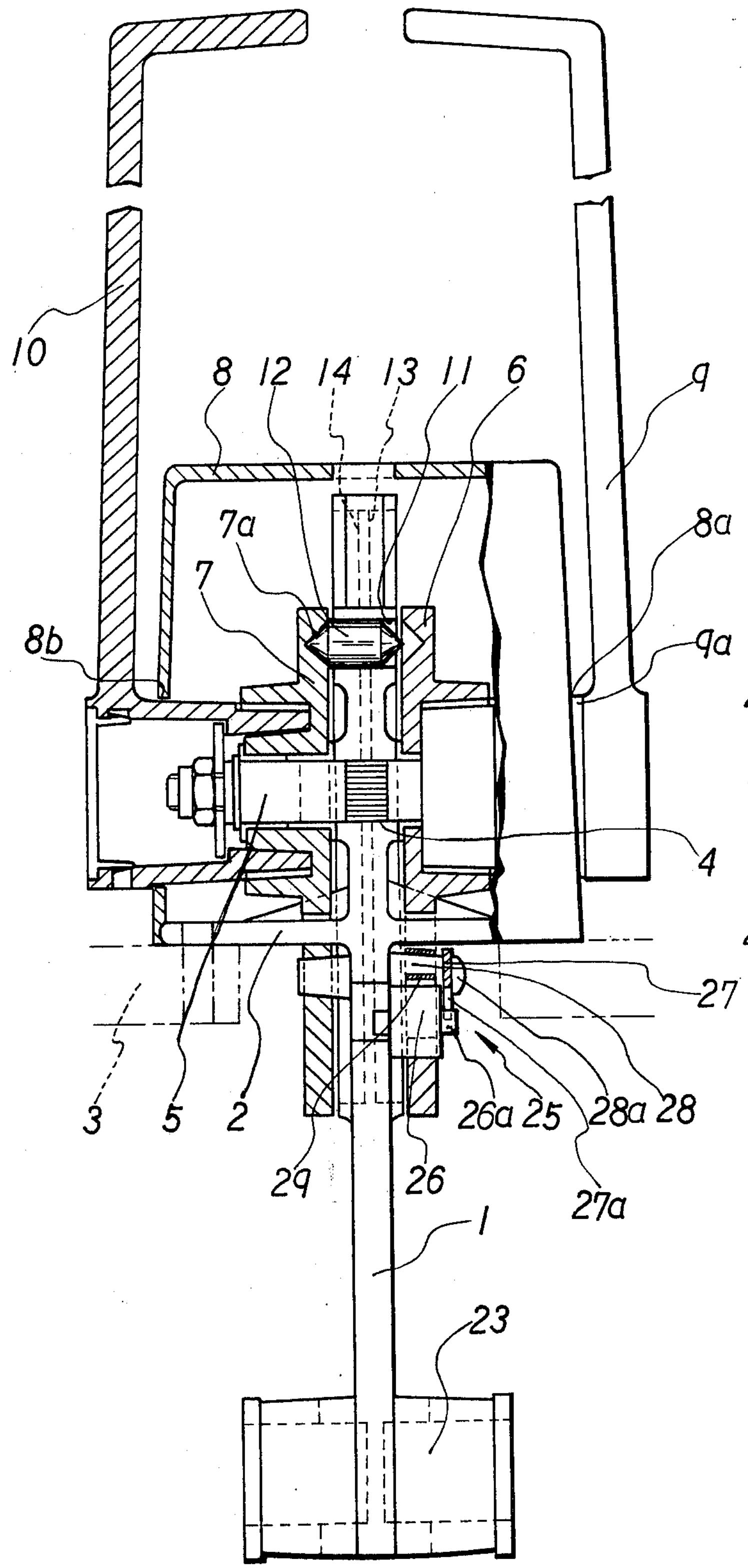
FIG. 2 is a view in section taken along the line II—II in FIG. 1.
Figure 3:
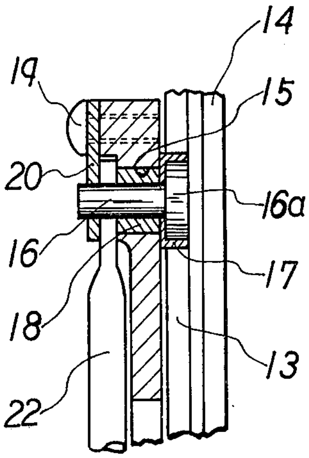
FIG. 3 is a view in section taken along the line III—III in FIG. 1.

With reference to the drawings, a main body 1 is secured to a frame 3 by a support plate 2 intersecting the main body 1 at right angles. The main body 1 has a hole 4 through which a shaft 5 extends. A clutch operating plate 6 and a throttle operating plate 7 are rotatably supported by the shaft 5 on the opposite sides thereof respectively. The boss portion **9*a* of a clutch lever 9 and the boss portion 10*a* of a throttle lever 10 extend respectively through apertures 8*a* and 8*b* in a casing 8 surrounding the upper part of the main body 1 and are fixed to the operating plate 6 and 7. The main body 1 is formed in its upper portion with a bore 11 through which a locking pin 12 extends. In opposed relation to the locking pin 12, the clutch operating plate 6 has three locking cavities, namely a forward notch 6*a*, a neutral notch 6*b* and a reverse notch 6*c* in which one end of the pin is engageable. Similarly, the throttle operating plate 7 has a locking cavity 7*a* in which the other end of the locking pin 12 is engageable. The locking pin 12 has a length substantially equal to the length of the bore 11 in the main body 1 plus the depth of the cavity formed in either one of the operating plates. The locking pin 12 is in the form of a rod having tapered opposite ends. The pin 12** is movable axially thereof by being pushed by each of the operating plates.

The main body 1 is formed in its opposite surfaces with two grooves 13 and two grooves 14 gently curved outward and facing the clutch operating plate 6 and the throttle operating plate 7 respectively. The clutch operating plate and the throttle operating plate have slots 15 (those in the throttle operating plate not shown) extending substantially at right angles to the grooves 13 and 14. A pin 16 extending through each of the slots 15 has at its one end a large-diameter portion **16*c* provided with a bush 17 and fitting in the groove 13. The pin 16 is further provided with a roller 18. Clutch cable set plates 20 are fastened to the upper surface of the clutch operating plate 6 by bolts 19 and have slots 21 in corresponding relation to the slots 15 of the clutch operating plate. The small-diameter portion of each pin 16 extends through the slot 21. A clutch cable connected to unillustrated clutch means has one end in the form of a cable rod 22 which is connected to the pin 16 as interposed between the clutch operating plate and the clutch cable set plate. A cable support 23 for supporting the other end of the clutch cable is provided with a guide pipe 24** for guiding the clutch cable. The same assembly as described is provided on each end side of the clutch operating plate. The throttle operating plate has a similar assembly on each end side thereof. Thus, each operating plate is provided with cable connecting assemblies on the opposite sides respectively as required for dual control, because with the clutch operating plate, for example, one end side thereof must be connected to the clutch means with the other end side connected to a clutch operating plate on the bridge or in the cabin.

The control unit further includes locking means 25 for locking the clutch lever in its neutral position. The locking means 25 comprises a locking pin 26 and a retainer plate 27 for supporting the pin 26. The retainer plate 27 is fastened to a projection 28 on the main body 1 by bolts **28*a* and formed in its lower midportion with a slit 27*a* receiving the stem 26*a* of the locking pin 26. A plate spring 29 provided around the projection 28 between the retainer plate 27 and the main body 1 biases the locking pin 26 downward into engagement with a recess 61 on the inner periphery of the clutch operating plate 6, whereby the clutch lever 9** is locked to its neutral position.

The operating and advantages of the control unit of this invention will be described below. The clutch lever 9, when in its neutral position, is held locked by the locking means 25 as described above. When the clutch lever 9 in this position is turned in the direction A in FIG. 1 against the depressing force of the plate spring 29, the clutch operating plate 6 turns with the lever 9 toward the position indicated in broken lines in FIG. 1. At this time, the locking pin 12 is forced into the cavity 7*a* of the throttle operating plate 7 by the clutch operating plate 6, locking the plate 7. As the clutch lever further turns, the clutch operating plate 6 comes to the broken-line position, i.e. to the forward position. When the plate 6 has been completely placed in this position, the locking pin 12 becomes movable axially thereof. Consequently, the throttle lever 10, when turned, forces out the locking pin 12 from the cavity 7*a* in the throttle operating plate 7, bringing the pin 12 into the notch 6*a* of the clutch operating plate 6, whereby the plate 6 is completely locked. With the clutch operating plate 6 thus locked, the throttle lever 10 is turnable to a desired position for acceleration or deceleration.

The control unit operates similarly when the clutch lever is turned in the direction B. This operation will not be described, therefore.

When the engine is to be initiated into warm-up operation, the clutch lever 9 is held in its neutral position, rendering the locking pin 12 axially movable. Accordingly, the throttle lever 10, when turned, engages the locking pin 12 into the notch 6*b* of the clutch operating plate 6, thereby locking the clutch lever 9 to its neutral position. This ensures the warm-up operation with safety, with the clutch held out of engagement even when the boat is subjected to the impact of waves or the like.

When the throttle lever 10 is returned to the neutral position upon completion of the warming up, the locking cavity 7*a* of the throttle operating plate 7 is brought into alignment with the notch 6*b* of the clutch operating plate 6, rendering the locking pin 12 axially movable. The clutch lever 9 is now turnable to control the engine in the usual manner. In this way, the control unit can be changed over for the usual operation with extreme ease.

When the clutch operating plate 6 is turned by the clutch lever 9 from its neutral position to the broken-line position, the pin 16 pivotably supporting the clutch cable rod 22 moves through the slots formed in the plate 6 and in the clutch cable set plate 20 while being guided by the groove 13 in the main body 1. In other words, the pin 16, which is adapted to move through the slots according to this invention, is movable along the groove 13. This structure greatly reduces the stroke of the swing of the clutch cable involved when the cable rod is merely pivoted to one end of the clutch operating plate without providing such a structure. The structure therefore serves to lengthen the life of the cable. Additionally, because the groove 13 is gently curved outward, the pin 16 is movable through the slot 15 with reduced friction, rendering the lever smoothly turnable. Like structure provided for the throttle cable with similar advantages will not be described.

Thus, the control unit of this invention is so constructed that when either one of the clutch lever and the throttle lever is turned, the other lever is invariably locked. Whereas the clutch lever is shiftable from forward to reverse while the throttle lever is advancing the throttle with conventional control units, the unit of this invention in no way involves such a risk. The present control unit can operate with safety free of any risk even when some external force should act on the clutch lever while the throttle is in operation, because the clutch lever is held locked in position. Moreover, such an outstanding advantage is achieved by a very simple construction in which a locking pin extending through a bore in the main body is axially movable and engageable in locking cavities formed in the clutch operating plate and in the throttle operating plate.

The control unit of this invention has another advantage of minimizing the stroke of the clutch cable as well as of the throttle cable when the cable is swung by the turn of the operating plate. This greatly improves the life of the cable which is frequently operated with control units of the type described.

This invention is not limited to the foregoing embodiment described with reference to the drawings. Various changes and modifications can of course be made without departing from the spirit of the invention.

What is claimed is:

1. A two-lever control unit comprising:
- a main body having a bore;
- a shaft mounted on said main body;
- a clutch operating plate rotatably supported by said shaft, said clutch operating plate being provided with three locking cavities of equal depth and having tapered walls;
- a clutch lever for rotatably driving said clutch operating plate;
- a throttle operating plate rotatably supported by said shaft, said clutch operating plate being provided with a locking cavity of the same depth as the clutch operating plate locking cavities and having a tapered wall;
- a throttle lever for rotatably driving said throttle operating lever;
- a locking rod slidably extending through said bore, said locking rod having tapered opposite ends, one tapered end being engageable in one of said three locking cavities formed in said clutch operating plate and the other tapered end being engageable in the locking cavity formed in said throttle operating plate, the length of the locking rod being equal to the length of said bore plus the depth of one of said locking cavities;

wherein rotation of one of said operating plates causes said locking rod to lock the other of said operating plates, and said tapered walls of said locking cavities and said cooperating locking rod tapered ends form ramps or release surfaces for facilitating unlocking of said locking rod from said clutch and throttle operating plate locking cavities.

2. A two-lever control unit as defined in claim 1 wherein the main body is formed with at least one gently outwardly curved groove in each of its surfaces facing the clutch operating plate and the throttle operating plate, and the groove has engaged therein a pin supporting one end of the clutch cable or throttle cable to be pivotally supported by the corresponding operating plate.

3. A two-lever control unit as defined in claim 2 wherein the end of the cable is supported by the pin, by the corresponding operating plate and by a set plate mounted on the operating plate, each of the corresponding operating plate and the set plate being formed with a slot extending substantially at right angles to the groove formed in the main body.

4. A two-lever control unit as defined in claim 2 wherein the main body is formed with the groove on each of the opposite sides of its opposite surfaces, and each of the opposite sides of the operating plates is adapted for connection to the end of the cable so as to be usable for dual control.

5. A two-lever control unit as defined in claim 4 wherein the end of the cable is supported by the pin, by the corresponding operating plate and by a set plate mounted on the operating plate, each of the corresponding operating plate and the set plate being formed with a slot extending substantially at right angles to the groove formed in the main body.

* * * * *